Aug. 20, 1940.　　A. KINDELMANN ET AL　　2,211,825
ADJUSTABLE SUPPORTING MEANS
Filed April 29, 1937　　3 Sheets-Sheet 1

INVENTOR.
Albert Kindelmann
Claude A. Soehl
BY Emery, Varney, Whittemore & Dix
ATTORNEYS.

Aug. 20, 1940.　　A. KINDELMANN ET AL　　2,211,825
ADJUSTABLE SUPPORTING MEANS
Filed April 29, 1937　　3 Sheets-Sheet 2
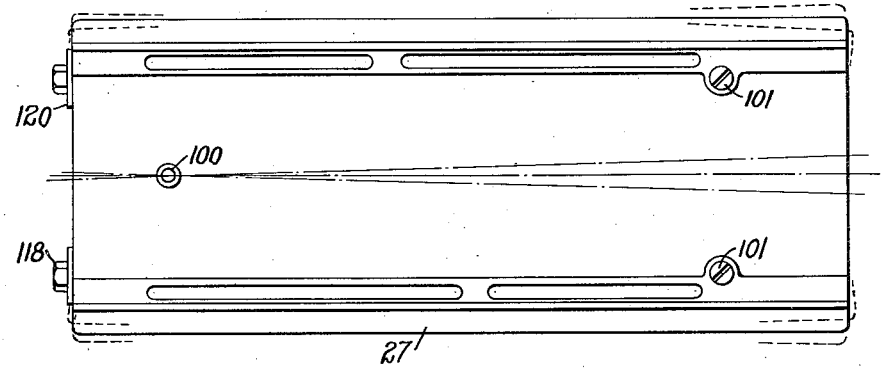
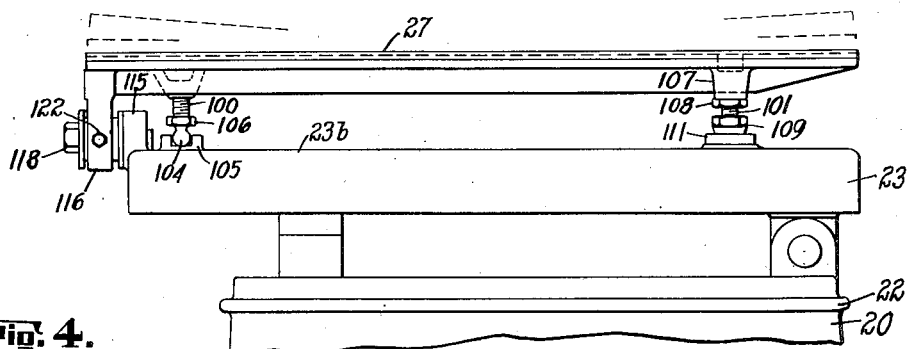
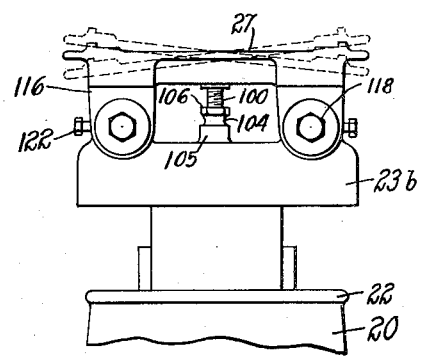
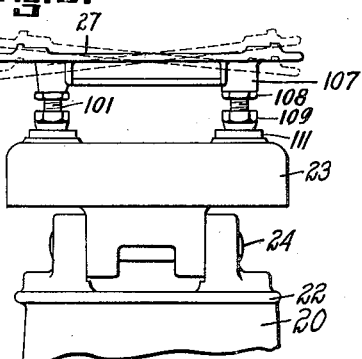
INVENTOR.
Albert Kindelmann
Claude A. Soehl
BY Emery, Varney, Whittemore & Dix
ATTORNEYS.

INVENTOR.
Albert Kindelmann
Claude A. Soehl
BY Emery, Varney, Whittemore + Dix
ATTORNEYS.

Patented Aug. 20, 1940

2,211,825

UNITED STATES PATENT OFFICE 2,211,825

ADJUSTABLE SUPPORTING MEANS

Albert Kindelmann, Floral Park, and Claude A. Soehl, Hensonville, N. Y., assignors to International Projector Corporation, New York, N. Y., a corporation of Delaware Application April 29, 1937, Serial No. 139,673

5 Claims. (Cl. 248—11)

This invention relates to adjustable supporting means, particularly to supporting means for the lamp house of motion picture projection machines and has for an object the provision of improvements in this art.

Throughout the remainder of the specification the invention will be discussed with particular reference to motion picture projection machines but at the same time its availability for other uses is to be kept in mind.

One of the features of the invention is the provision of a lamp house support which permits great latitude of adjustment of the lamp house relative to the projection head whereby to coordinate the axis of the light beam of the lamp house with the axis of projection of the projection head.

Another feature of the invention is the provision of an adjustable lamp house support which is simple, easy to adjust, and practically incapable of being broken under normal adjusting conditions.

Another feature of the invention is the provision of an adjustable lamp house support which firmly anchors the lamp house over its entire base area after adjustment has been made, whereby to avoid disadjustment and the effects of vibration. Specifically the adjustment is effected through a three point support and the locking is effected through a four point connection whereby all four corners of the lamp house base or carriage are secured against strains.

The invention will be more fully comprehended from a consideration of an illustrative embodiment thereof which will be described in connection with the accompanying drawings wherein:

Fig. 2 is a top plan view of a lamp house base plate or carriage;

Fig. 3 is a side elevation;

Fig. 4 is a rear end elevation;

Fig. 5 is a front end elevation;

Figure 1:
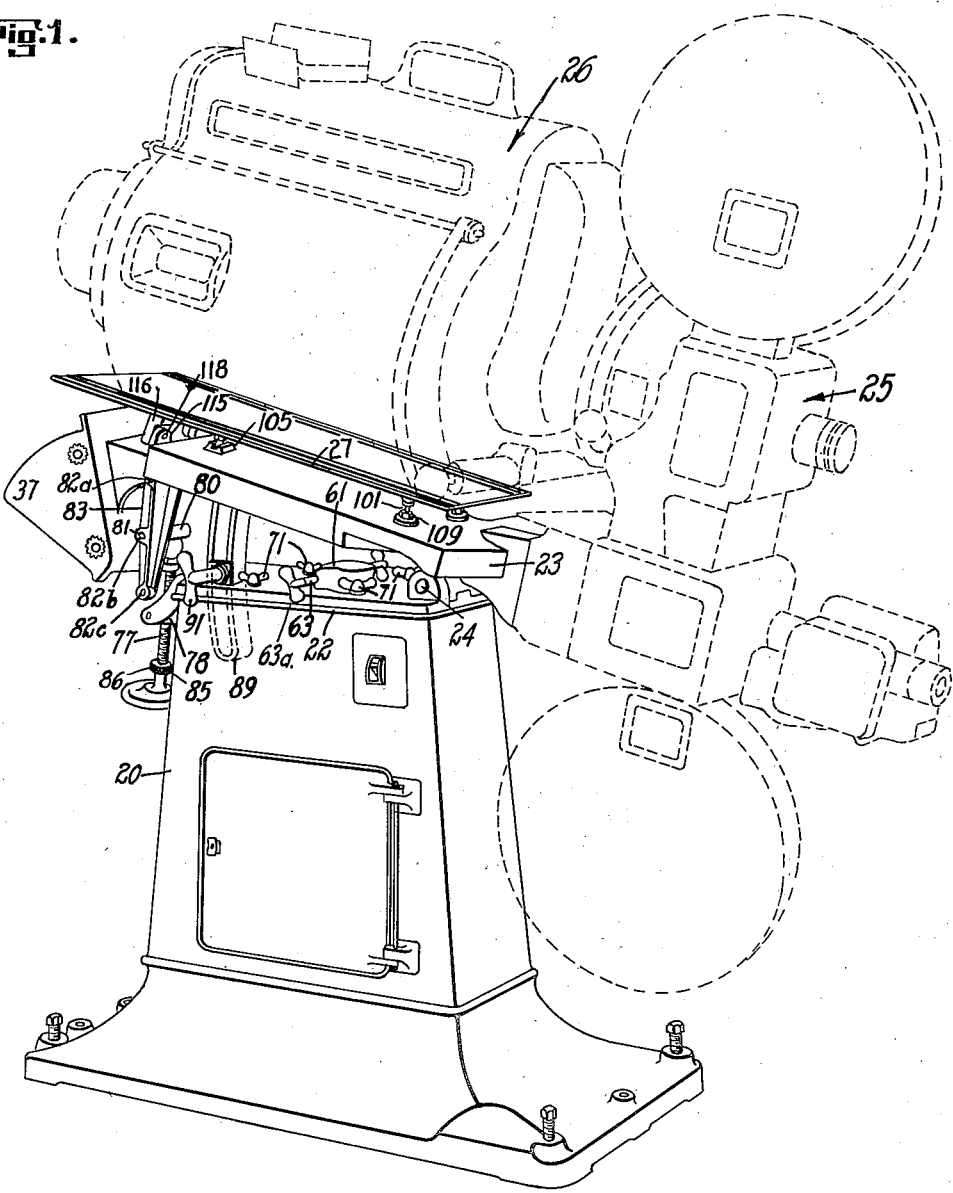
Fig. 1 is a right or operating side perspective view of a projection machine embodying the improved lamp house support.
Figure 6:
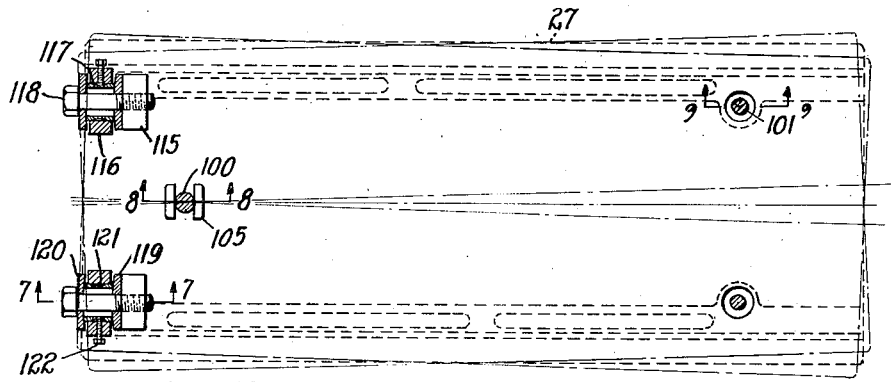
Fig. 6 is a plan view below the lamp house base plate with the plate shown in dotted lines.
Figure 7:
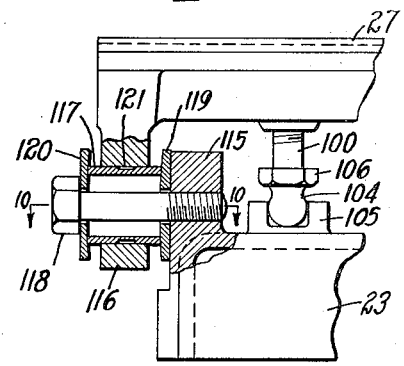
Fig. 7 is a vertical section of a locking connection for the rear end, the view being taken on the line 7—7 of Fig. 6.
Figure 8:
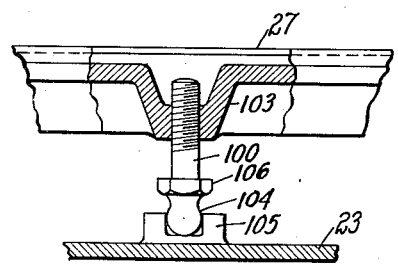
Fig. 8 is a vertical section of one of the three-point supports, the view being taken on the line 8—8 of Fig. 6.
Figure 9:
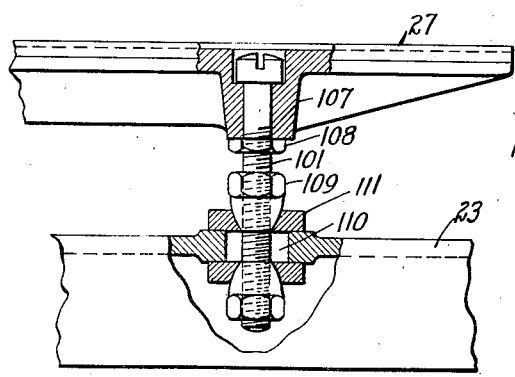
Fig. 9 is a vertical section of another one of the three-point supports, the view being taken on the line 9—9 of Fig. 6.
Figure 10:
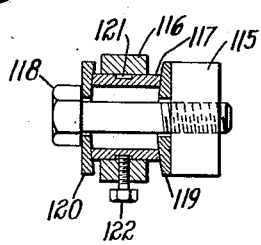
Fig. 10 is a section taken on the line 10—10 of Fig. 7.

The lamp house support hereby provided furnishes a very great range of adjustment of the lamp house. In the embodiment illustrated, assuming the parts to be in horizontal position, the lamp house has the following movements.

1. It may be raised or lowered bodily.
2. It may be raised or lowered at the front end only.
3. It may be raised or lowered at the rear end only.
4. It may be raised and lowered conjointly in opposite directions at the front and rear ends.
5. It may be raised or lowered on the right side only.
6. It may be raised or lowered on the left side only.
7. It may be raised and lowered conjointly in opposite directions on the right and left sides.
8. It may be raised or lowered at any corner.
9. It may be raised and lowered conjointly in opposite directions at two diagonal corners.
10. It may be moved laterally in either direction at the front end only.
11. It may be moved laterally in either direction at the rear end only.
12. It may be moved laterally at both ends together in either direction.
13. Or it may be moved laterally conjointly in opposite directions at opposite ends.

Considering all possible movements together it is seen that a number of movements in addition to universal movement are provided for. Universal movement is considered to be movement about three coordinate axes (not necessarily intersecting axes). Movements 2, 3 and 4 above may be considered as part of the universal movement about a transverse horizontal axis. Movements 5, 6 and 7 may be considered as part of the universal movement about a longitudinal horizontal axis. Movements 10, 11 and 13 may be considered as part of the universal movement about a vertical axis.

In addition to movements 2, 3, 4, 5, 6, 7, 10, 11 and 13, which fairly constitute the universal movement, there remains movement 1 which may be referred to as the elevating movement or vertical translation. This may be movement into successive parallel planes, either horizontal or tilted in any direction, or it may be a combined elevating and tilting movement.

There also remains movement 8 which may be referred to as the corner tilting movement.

Again there remains movement 9 which may be referred to as the diagonal corner tilting movement. It is a movement about coordinate diagonal horizontal axes (not necessarily intersecting axes).

Finally there remains movement 12 which may be referred to as the sidewise traversing movement or horizontal translation.

It is thus seen that there is universal movement, four distinct movements in addition to the universal movement, universal and the four other movements in any translated or tilted position, and all combinations of these movements.

As previously mentioned these movements in the illustrative embodiment are all provided by a special three-point support and the parts are firmly secured after adjustment by a four-point locking connection.

Referring to Fig. 1 of the drawings, the invention may be employed in connection with a motion picture projection machine which comprises a pedestal 20 surmounted by a pedestal cap or pedestal arm support 22, a pedestal arm 23, a projection head 25 and a lamp house 26. The term "projection head" as used herein includes the picture projection mechanism, sound mechanism and all accessories mounted therewith. Both the projection head and the lamp house are mounted on the arm 23 which tilts about a pivot 24 at the front end of the pedestal arm support.

The pedestal arm support 22 moves laterally in a horizontal plane about a vertical axis near its rear end, the turning being effected through a gear shaft 63 provided with hand pieces 63a at each end and associated mechanism disposed within a housing 61. The pedestal arm support may be locked in position by a plurality of clamping screws 71.

The pedestal arm 23 may be tilted by a hand screw 77 rotatably secured at its upper end in a T-shaped anchor member 80 connectible at selective points 82a, 82b, 82c of parallel bracket arms 83 of the pedestal lever by a removable rod 81. The tilting screw 77 is threaded in a pivoted nut 78 carried by parallel bracket arms secured to the pedestal arm support. Movement of the tilting screw may be limited by split locking nuts 85 adapted to be clamped at selected places on the screw 77 by suitable lock screws 86.

The pedestal arm 23 may be locked in adjusted positions by a clamp screw 91 and related parts mounted on the pedestal arm support and engaging a broad slotted quadrant 89 secured to the pedestal arm.

The various movements of the lamp house are herein preferably secured through a special three point support. The parts are firmly secured after adjustment by a four point locking connection, two of which locking connections are common to two of the supports.

As shown in Figs. 2–9, the lamp house carriage or plate 27 is supported by three spaced legs in the form of adjustable screws 100, 101, 101. The screws 101 are near the front end and are preferably equally spaced from the front and sides of the plate 27. The screw 100 is disposed alone at the center and near the rear end of the plate 27.

The rear screw 100 is threaded into a crater 103 formed in the plate 27, which insures that the upper end of the screw will not emerge above the top of the plate to interfere with parts carried thereon. The lower end of the screw is provided with a spherical head or knob 104 which operates within a transverse groove formed between two raised guides 105 carried by the rear portion 23b of the pedestal arm 23. Intermediately the screw is provided with an integral noncircular flange or nut 106 by which it may be turned. The screw may be adjusted to move the plate 27 up or down or may be adjusted in position in the groove if the plate is moved in either direction laterally. The plate may also be tilted in any direction about the spherical knob 104. The knob 104 is not permitted to move either forwardly or rearwardly in its slot and thus prevents the plate 27 and parts carried thereby from sliding endwise when the supports and clamping means therefor are released for making adjustments when the pedestal arm 23 is in a tilted position.

The front screws 101 are rigidly secured in tubular projections 107 formed on the lamp house plate 27. The upper ends or heads of the screws are recessed below the upper surface of the plate 27 and the screws are rigidly secured to the plate by nuts 108. The lower end of the screws 101 pass through oversized apertures 110 formed in the pedestal arm and upon the screws are threaded spaced acorn nuts 109 having convex surfaces disposed toward each other and on opposite sides of the pedestal arm. Washers 111 having concave seats cooperating with the convex surfaces of the nuts 109 are interposed between the nuts and machined bosses provided at the sides of the apertures. The washers have flat surfaces which cooperate with the flat machined surfaces of the bosses. The apertures are large enough to permit lateral movement of the screws in any direction but the largest movement provided for is transversely of the pedestal arm. The nuts 109 are adapted to raise and lower the lamp house plate and also to lock it in position after adjustment. The lower nuts 109 may be referred to as the locking nuts since they usually are not required to pull the parts down but only to lock them in position.

Since the rear end of the lamp house plate is supported during adjustment only by the single screw 100 at the center, the corners would be left overhanging without support if additional supporting means were not provided. It is desirable that the corners be directly supported to minimize vibration and avoid possible breakage. Moreover, the particular adjusting device 100 provided at the rear end of the lamp house plate does not lock in position in the groove in which it moves, so it is desirable to lock this end of the plate against movement after the adjustment has been made.

The means hereby provided for locking the rear corners of the lamp house plate, as shown in Figs. 3, 4, 6 and 7, comprises interrelated parts on the lamp house plate and the pedestal arm which are movable relative to each other and are locked together when desired by any suitable means. In the specific embodiment illustrated, the pedestal arm 23 is provided at its rear end with upstanding lugs 115 and the lamp house plate is provided with depending lugs 116 so located that they are disposed just behind the pedestal arm lugs 115. The plate lugs are provided with oversized openings within which are fitted oversized sleeves or bushings 117 which are somewhat longer than the openings. Locking screws 118 pass through the sleeves and at their inner ends are threaded into the pedestal arm lugs 115. Washers 119 and 120 are placed between the ends of the sleeves and adjacent parts.

The inner or front washers 119 are made convex on their outer or rear faces and the outer or rear washers 120 are made concave on their inner or front faces. This provides clamping surfaces of substantial area between the washers and the ends of the sleeves in any adjusted position so that the locking action when the screws are tightened may be secure. The ends of the sleeves may be shaped to fit the curved surfaces of the washers. The curved surfaces are formed (Fig. 7) as approximately spherical surfaces drawn from a center on the extended axis of the screws 118. The axes of the locking screws 118 are located approximately in the same horizontal plane as the center of the knob 104.

It will be evident since the rear end of the lamp house plate can move laterally or vertically away from the central position selected for determining the shape of the curved surfaces, that the curved surfaces will not always have a perfect fit with adjacent parts but they will have a closer approximation to a fit than if the surfaces had been otherwise determined or simply made flat.

The sleeves 117 may have a small longitudinal movement within their openings in the lugs 116 in order that the parts may be clamped together without strain. Means are provided for retaining the sleeves while permitting this longitudinal movement. As shown, the sleeves are provided with annular exterior grooves 121, and set screws 122 threaded in the lugs enter these grooves to retain the sleeves.

The mounting means for the lamp house plate will be seen to be capable of providing all of the movements referred to. Some of the movements are indicated in dotted lines in Figs. 2 to 6.

In operation, the various movements of the lamp house may be accomplished as follows:

1. Movement 1, wherein the lamp house is raised or lowered bodily, is accomplished by turning all of the screws 100 and 101 up or down together. It will be understood in this and all other movements that the locking connection is loosened before the movements are begun and tightened after the adjustments have been made.

2. The second movement, wherein the front end of the lamp house is raised or lowered, is accomplished by operating the two front screws 101 up or down together.

3. The third movement, wherein the rear end of the lamp house is raised or lowered, is accomplished by turning the rear screw 100 up or down.

4. The fourth movement, wherein the front and rear ends are moved conjointly in opposite senses or directions, is accomplished by turning the front screws 101 in one direction and the rear screw 100 in the opposite direction.

5. The fifth movement, wherein the lamp house is raised or lowered on the right side only, is accomplished by raising or lowering the right front screw 101 and raising or lowering the rear screw 100 in the same direction but by a lesser movement, the left front screw 101 being maintained in a fixed position.

6. The sixth movement, wherein the left side only is raised or lowered, is accomplished in the same way as movement 5 but with the left front screw operated and the right front screw kept stationary.

7. The seventh movement, wherein the lamp house is raised and lowered conjointly in opposite directions on opposite sides, is accomplished by turning the right front screw in one direction and the left front screw in the opposite direction, the rear screw 100 in the center being kept stationary.

8. The eighth movement, wherein the lamp house is raised or lowered at any corner, is accomplished by turning one of the front screws 101 up or down and turning the rear screw and the other front screw up or down but by a lesser movement.

9. The ninth movement, wherein the lamp house is raised and lowered conjointly in opposite directions at two diagonal corners, is accomplished by turning either of the front screws up or down while maintaining the other screws stationary.

10. The tenth movement, wherein the front end is moved laterally in either direction, is accomplished by sliding the front screws 101 transversely in their apertures, the rear screw being maintained in a fixed position. In this movement the rear screw must be manually held in position in its lateral groove because the rear locking connection as well as the front locking connection is loosened so that the rear screw 100 is not otherwise held.

11. The eleventh movement, wherein the rear end is moved laterally in either direction, may be accomplished by moving the rear screw 100 in its groove while holding the front end against transverse lateral movement. The front screws must be unclamped for this movement because one of them must slide forward in its aperture and the other must slide rearward in its aperture, the turning occurring about a point between the two front screws.

12. The twelfth movement, wherein both ends are moved laterally, is accomplished by sliding both the front screws 101 and the rear screws 100 laterally in their ways.

13. The thirteenth movement, wherein the lamp house is moved conjointly in opposite directions at opposite ends, is accomplished by moving the front screws laterally in one direction in their apertures and moving the rear screw 100 laterally in the opposite direction in its groove.

The other movements which are combinations of the above movements may be accomplished by appropriate adjustment of the several screws, in a manner which will be obvious from the above explanations.

It will thus be seen that the invention provides simple, sturdy and dependable means for adjusting the lamp house in a great variety of ways to make the axis of the beam of light coincide with the axis of projection of the projection head or for any other adjustment desired. Also that these various movements are provided without danger of breaking any of the mechanism. Moreover, simple, convenient and reliable means are provided for locking the lamp house in adjusted position, the locking means being of such a nature that all operations of the lamp house plate are fully supported whereby breakage and vibration are avoided. The provision of these various adjustments of the lamp house avoids the necessity of making many adjustments to mechanism within the lamp house which were previously required.

It is desirable in providing supports of this nature for motion picture projection apparatus to make such supports very sturdy so that vibrations, which may develop in the machine or in the building or floor upon which it is mounted, will not be conveyed in a manner which will make the projected picture shake or move on the screen. The apparatus herein provided fulfills such a desire while at the same time permitting minute adjustments in any direction to be made, and after the adjustments have been made to bind or thoroughly secure the support in its minutely adjusted position.

It will be observed that the structure herein provided or modifications thereof may be used in machines or devices employed for other and different purposes and such uses are to be considered as being within the scope of this invention.

While one embodiment of the invention has been described in detail in order to illustrate the principles of the invention, it is to be understood that the invention itself is not thus limited but may be variously embodied within the limitations of the prior art and the scope of the subjoined claims.

We claim:

1. Supporting means comprising in combination, a supporting member, means whereby said supporting member is adjustably supported, a supported member, two symmetrical supporting legs near one end of said members, said legs being rigidly secured to one of said members and being adjustable in length relative to the other of said members, said legs also having lateral movement in any and all directions relative to said other member, and a third supporting leg adjustable in length relative to one of said members and having lateral movement in one direction relative to the other of said members.

2. Supporting means comprising in combination a foundation member, a carriage, two adjusting, supporting and locking members supporting one portion of the carriage on the foundation member, a single adjusting and supporting member supporting the other portion of the carriage and means distinct from the members to lock the last mentioned portion of the carriage on the foundation member.

3. Supporting means comprising in combination a foundation member, a carriage, triple adjusting means to support said carriage on the member, two of said adjusting means also serving to lock one end portion of the carriage to the member and locking means distinct from the said adjusting means to lock the other end of the carriage to the member, said last-mentioned locking means providing for lateral adjustment of said last-mentioned end of the carriage relative to the member.

4. Supporting means comprising in combination a foundation member, a carriage, two adjusting, supporting and locking means interposed between the member and carriage and adjacent one end thereof and an adjusting and supporting means adjacent the other end thereof whereby the carriage is supported on and may be adjusted relative to the member, the three said supporting means forming the vertices of an imaginary triangle, and two locking devices distinct from the said supporting means and adjustably connecting said carriage and said member to lock the member to the portion of the carriage principally supported by the single adjusting means, the said locking means and locking devices being positioned at the angles of an imaginary rectangle.

5. Supporting means including a foundation member, a carriage, two spaced adjusting legs supporting one end of said carriage on said member, means to lock said legs in their adjusted positions, a single adjusting leg supporting the mid portion of the other end of said carriage on said member and locking means distinct from the said legs to lock the last mentioned portion of said carriage to said member.

ALBERT KINDELMANN.
CLAUDE A. SOEHL.